(12) United States Patent
Powell et al.

(10) Patent No.: US 7,284,703 B2
(45) Date of Patent: Oct. 23, 2007

(54) SYSTEM AND METHOD FOR MINIMIZING UNWANTED RE-NEGOTIATION OF A PASSIVE RFID TAG

(75) Inventors: Kevin J. Powell, Annapolis, MD (US); Wayne E. Shanks, Baltimore, MD (US); William R. Bandy, Gambrills, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 80 days.

(21) Appl. No.: 10/688,535

(22) Filed: Oct. 20, 2003

(65) Prior Publication Data

US 2004/0145454 A1 Jul. 29, 2004

Related U.S. Application Data

(60) Provisional application No. 60/419,082, filed on Oct. 18, 2002.

(51) Int. Cl.
*G06K 7/08* (2006.01)

(52) U.S. Cl. ............... 235/451; 235/375; 340/10.2; 340/10.3; 340/572.1

(58) Field of Classification Search ........... 235/451, 235/375; 340/10.3, 572.1, 10.2
See application file for complete search history.

(56) References Cited

U.S. PATENT DOCUMENTS

| | | | |
|---|---|---|---|
| 5,124,699 A | | 6/1992 | Tervoert et al. |
| 5,345,231 A | | 9/1994 | Koo et al. |
| 5,525,992 A | * | 6/1996 | Froschermeier ............ 340/10.2 |
| 5,537,105 A | | 7/1996 | Marsh et al. |
| 5,856,788 A | * | 1/1999 | Walter et al. .............. 340/10.2 |
| 5,995,019 A | | 11/1999 | Chieu et al. |
| 6,107,910 A | | 8/2000 | Nysen |
| 6,265,962 B1 | * | 7/2001 | Black et al. ............... 340/10.2 |
| 6,404,325 B1 | | 6/2002 | Heinrich et al. |
| 6,433,671 B1 | | 8/2002 | Nysen |
| 6,531,957 B1 | | 3/2003 | Nysen |
| 6,580,358 B1 | | 6/2003 | Nysen |

(Continued)

OTHER PUBLICATIONS

International Search Report from the International Searching Authority, issued Jul. 14, 2004 for Appl. No. PCT/US03/33041, 8 pages.

*Primary Examiner*—Daniel Hess
*Assistant Examiner*—Allyson N Trail
(74) *Attorney, Agent, or Firm*—Sterne Kessler Goldstein & Fox, P.L.L.C.

(57) ABSTRACT

A system and method is provided for minimizing the unwanted re-negotiation of passive RFID tags. Each tag stores a confirmed read flag to indicate whether the tag has been previously read. During subsequent interrogations of the tag population, the reader has the capability to address all tags in a tag population or to address only unread tags. When addressing all tags, the reader sends a symbol causing all tags to ignore their confirmed read flag value. Each tag may also clear its confirmed read flag when this symbol is received. When addressing only unread tags, the reader sends a symbol causing each tag to evaluate its confirmed read flag value. Those tags that have a confirmed read flag value indicating "read" will enter dormant state and will not be re-negotiated. Those tags that have a confirmed read flag value indicating "not read" will continue to communicate with the reader.

22 Claims, 6 Drawing Sheets

U.S. PATENT DOCUMENTS

| | | | |
|---|---|---|---|
| 6,724,297 B1* | 4/2004 | Vacherand et al. | 340/10.3 |
| 6,950,009 B1 | 9/2005 | Nysen | |
| 2002/0024422 A1* | 2/2002 | Turner et al. | 340/10.3 |
| 2002/0149481 A1* | 10/2002 | Shanks et al. | 340/572.1 |
| 2002/0152044 A1* | 10/2002 | Shanks et al. | 702/106 |
| 2002/0167405 A1* | 11/2002 | Shanks et al. | 340/572.1 |
| 2003/0052161 A1* | 3/2003 | Rakers et al. | 235/375 |
| 2003/0137400 A1 | 7/2003 | Heinrich et al. | |
| 2004/0036575 A1* | 2/2004 | Patterson et al. | 340/10.3 |
| 2004/0113790 A1* | 6/2004 | Hamel et al. | 340/572.1 |
| 2004/0134984 A1* | 7/2004 | Powell et al. | 235/451 |
| 2005/0104719 A1* | 5/2005 | Ramamurthy et al. | 340/10.1 |

* cited by examiner

SYSTEM AND METHOD FOR MINIMIZING UNWANTED RE-NEGOTIATION OF A PASSIVE RFID TAG

CROSS-REFERENCE TO RELATED APPLICATIONS

This application claims priority to U.S. Provisional Application No. 60/419,082, entitled "System and Method for Unwanted Re-Negotiation of a Passive RFID Tag," filed Oct. 18, 2002, which is hereby incorporated by reference in its entirety.

FIELD OF THE INVENTION

The present invention is related to methods for communicating between radio frequency identification (RFID) tags and an RFID reader.

BACKGROUND OF THE INVENTION

Passive RFID tags obtain their operational power from radio frequency (RF) energy provided by the tag reader. As a result, passive RFID tags are susceptible to power loss caused by conditions in their operating environment. For example, reflections of transmitted signals off surfaces in the operating location may cause multipath cancellation. This multipath cancellation causes RF nulls to be created at various points in the operating location. An RF null is a location where the signal drops-out (e.g., the signal strength is essentially zero). Thus, a passive RFID tag may loose power and regain power when moving through an RF null. In addition, the use of frequency hopping procedures may also cause a tag to loose and regain power. Currently, the Federal Communication Commission (FCC) requires a reader to change frequency of operation on a periodic basis ranging from 50 to 400 milliseconds. During this period of time, the reader adjusts its frequency to a new frequency. The change in reader frequency may create rapid changes in RF energy. This rapid change in RF energy may in turn force tags into and out of RF nulls.

In a conventional passive RFID tag, the tag is unable to maintain its state after a loss of power. When power is restored to the tag, the tag is reset. Thus, the tag may enter a state indicating it has not been read. As a result, a tag may be re-negotiated by the reader even though the tag has already been successfully read. These superfluous negotiations of tags introduce inefficiency into the tag interrogation process. As the size of the tag population increases, the inefficiency introduced by unwanted re-negotiation of read tags also increases.

One technique to address the inefficiency introduced by the loss of tag state is to implement a persistent state on the tag. For example, a transient memory device such as a capacitor can be used to hold the state of a tag during power loss. However, in this technique, the length of retention of the value in memory can vary from less than a second to a half-second or more. This variation is due to the fact that voltage drains from the capacitor over time. Furthermore, voltage amplitude can vary based on distance from the reader, also introducing variations in the length of transient storage. In addition, temperature often widely varies the characteristics of a silicon storage device which greatly adds to the operational range in length of retention.

In addition, using this technique, the reader has no control over the memory device in each tag. A tag retains knowledge of its persistent state until the memory device times-out. Therefore, a reader cannot re-negotiate all tags in a population of tags until the persistent "read" state stored in each tag has timed out.

Consequently, a need exists for reader controlled maintenance and management of persistent states stored in passive RFID tags.

BRIEF SUMMARY OF THE INVENTION

The present invention is directed to a system and method for minimizing the unwanted re-negotiation of passive RFID tags. In accordance with aspects of the present invention, the RFID system includes one or more readers and a population of tags. Each tag includes an RF interface, a state machine, and a data storage section. The data storage section stores information used by the tag during communication with a reader. The stored information includes the tag identification number and the confirmed read flag. A confirmed read flag indicates whether the tag has been previously read. The memory storing the confirmed read flag retains the value of the flag during a loss of power to the tag.

In an aspect of the present invention, upon successful negotiation of a tag, the reader sends a symbol causing the tag to set the value of its confirmed read flag to "read." The symbol may be an implicit instruction or have multiple tag functions associated with it. The confirmed read flag allows the tag to remember for an indefinite period of time that it has been read. During subsequent interrogations of the tag population, the reader has the capability to globally address a tag population. In this aspect of the present invention, the reader sends a symbol which causes the entire population of tags to ignore the value stored in their confirmed read flag. This symbol may be an implicit instruction or have multiple tag functions associated with it. In an alternate embodiment, the tags clear any value stored in their confirmed read flag.

The reader also has the capability to only address unread tags. In this aspect of the present invention, the reader sends a symbol which causes each tag in the entire tag population to evaluate the value of its confirmed read flag. Those tags that have a confirmed read flag with a value indicating "read" will transition to dormant state and will not be re-negotiated. Those tags that have a confirmed read flag with a value indicating "not read" (e.g., flag not set) will continue to communicate with the reader.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
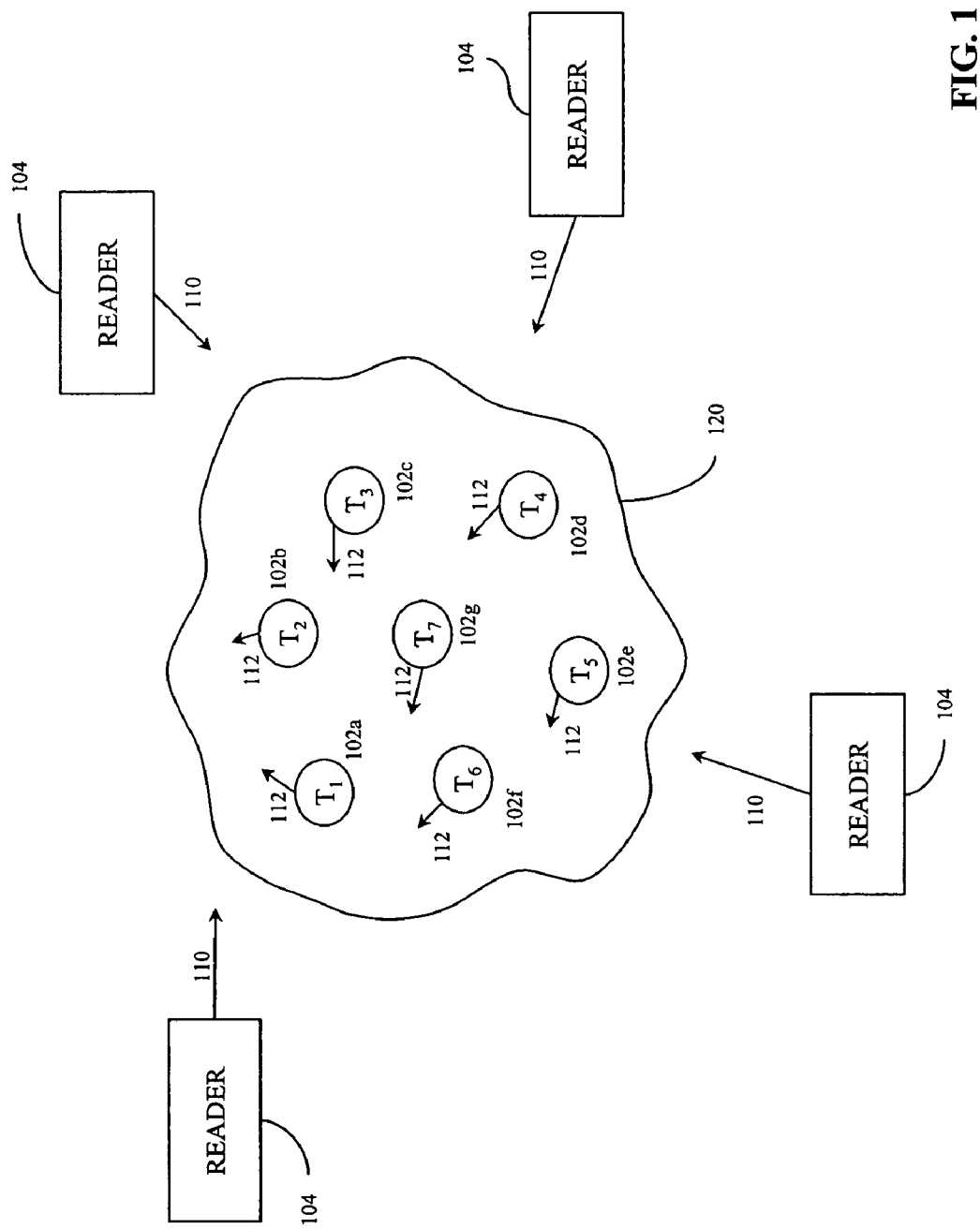
FIG. 1 is a block diagram of an environment where one or more tag readers communicate with one or more tags, according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Introduction 1.1 Tag Interrogation Environment

Before describing the present invention in detail, it is helpful to describe an example environment in which the invention may be implemented. The present invention is particularly useful in radio frequency identification (RFID) applications operating in noisy environments. FIG. 1 illustrates an environment 100 where one or more RFID tag readers 104 communicate with an exemplary population of RFID tags 120, according to the present invention. As shown in FIG. 1, the population of tags 120 includes seven tags 102a-102g. According to embodiments of the present invention, a population of tags 120 may include any number of tags 102. In some embodiments, a very large numbers of tags 102 may be included in a population of tags 120, including hundreds, thousands, or even more.

Figure 2:
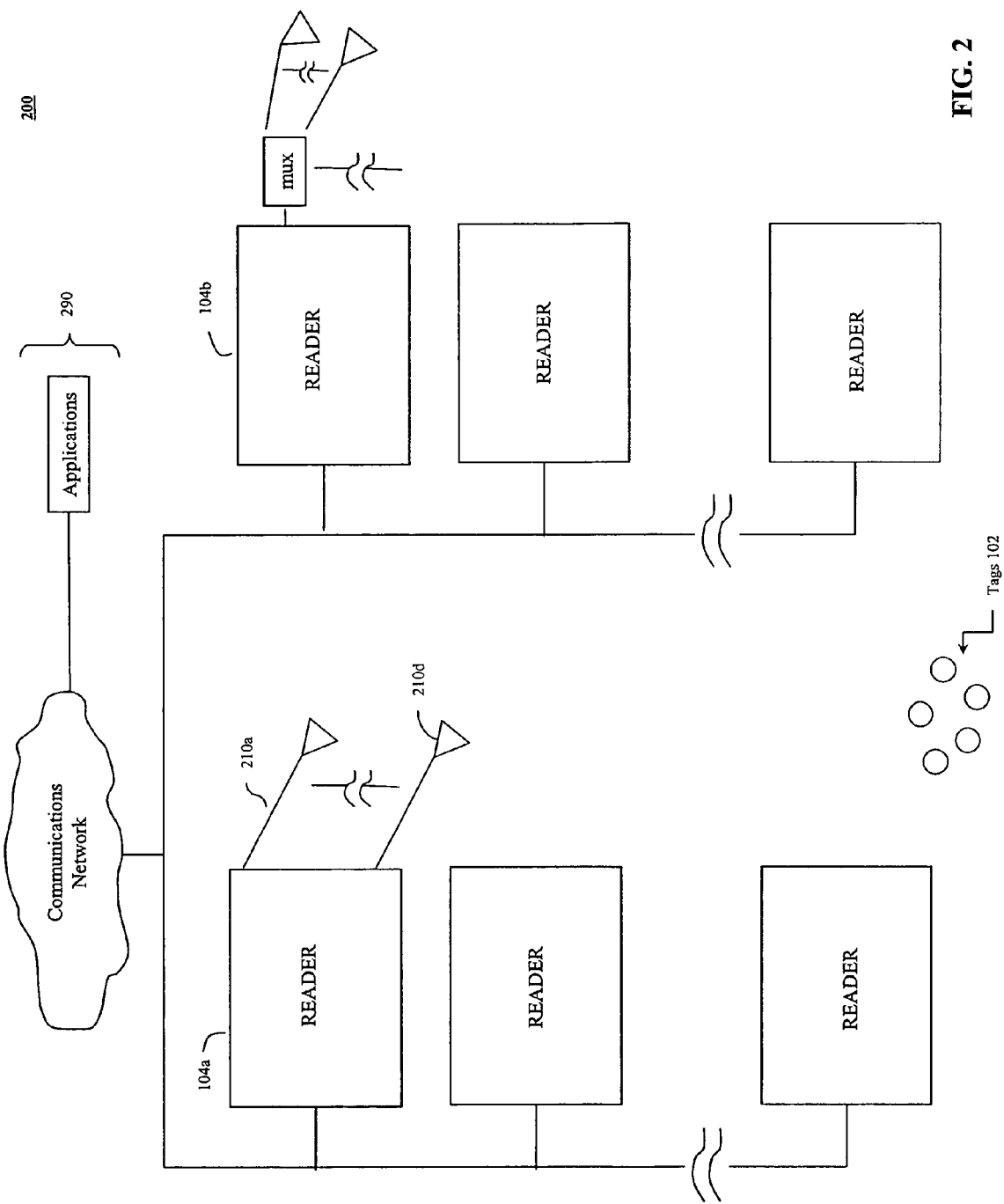
FIG. 2 is a block diagram illustrating an architectural overview of communication between one ore more readers and one or more tags, according to an embodiment of the present invention.

Exemplary environment 100 also includes one or more readers 104. These readers 104 may operate independently or may be coupled together to form a reader network, as shown in FIG. 2. A reader 104 may be requested by an external application to address the population of tags 120. Alternatively, the reader may have internal logic that initiates communication. When the reader is not communicating with the population of tags, the reader 104 typically does not emit RF energy. This allows other readers to act upon the same population of tags, but from a different orientation, so as to achieve as complete of coverage with RF signals into the entire population of tags as possible. In addition, the same reader may act upon the same population of tags using a different frequency to increase tag coverage.

According to the present invention, signals 110 and 112 are exchanged between a reader 104 and the tags 102 according to one or more interrogation protocols. An exemplary interrogation protocol is the binary tree traversal protocol described below. Signals 110 and 112 are wireless signals, such as radio frequency (RF) transmissions. Upon receiving a signal 110, a tag 102 may produce a responding signal 112 by alternatively reflecting and absorbing portions of signal 110 according to a time-based pattern or frequency. This technique for alternatively absorbing and reflecting signal 110 is referred to herein as backscatter modulation. The present invention is also applicable to RFID tags that communicate in other ways.

FIG. 2 is a block diagram of an example RFID system 200 providing communications between one or more readers 104 and tags 102, according to an embodiment of the present invention. REID system 200 includes a user application domain 290, a network of readers 104a-n, and one or more tags 102. Note that the invention is applicable to a single reader, as well as to a plurality of readers coupled in a network, as shown in FIG. 2. Hence, although "reader" is often referred to herein, it should be understood that the present invention is applicable to any number of readers in any configuration as required by a particular application.

Each reader 104 communicates with a tag 102 via one or more antenna(e) 210. A variety of antenna configurations are available. For example, in an embodiment, reader 104a can be directly connected to up to four antennas (e.g., antennas 210a-210d). In another example embodiment, reader 104b is coupled to and controls a multiplexer. A multiplexer allows for a greater number of antennas to be switched to a single antenna port of the reader. In this way reader 104b may accommodate a greater number of antennae.

User application domain 290 may include one or more user applications. User applications may communicate with one or more readers 104 via a communications network or data link. A reader may receive requests regarding one or more tags 102 from the user application domain 290. For example, an application may request a reader 104 to interrogate a population of tags.

As will be appreciated by persons skilled in the relevant art(s), the present invention can be implemented on a variety of reader platforms and reader network configurations.

1.2 Tag Embodiments 1.2.1 Structural Overview

Figure 3A:
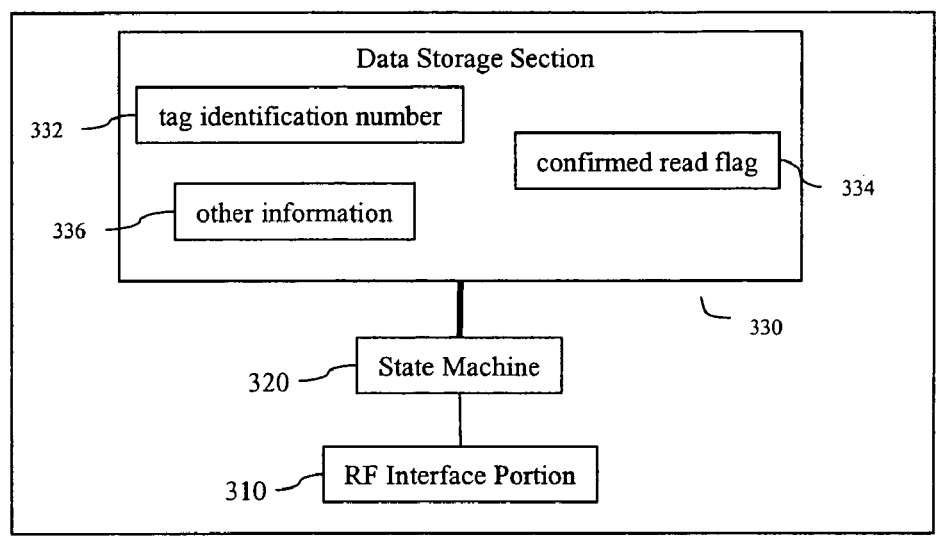
FIG. 3A is a block diagram of an illustrative tag according to an embodiment of the present invention.

FIG. 3A is a block diagram of a tag 102, according to an example embodiment of the present invention. Tag 102 includes an RF interface portion 310, a state machine 320, and a data storage section 330. Data storage section 330 may include one or more memory elements as required by a particular application. Data storage section 330 stores information used by tag 102 to communicate with reader 104. In an embodiment, information stored in data storage module 330 includes a tag identification number 332, a confirmed read flag 334, as well as optionally other information 336, if desired.

Figure 3B:
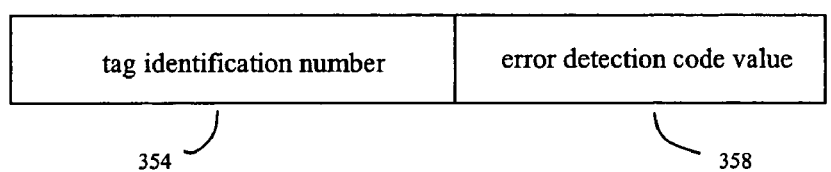
FIG. 3B illustrates an example unique tag identification number.

In accordance with such an embodiment, each tag 102 is identified by a unique identification number. The unique tag identification number 332 may be permanently stored or may be temporarily stored in a memory in data storage section 330. FIG. 3B depicts an example of the layout of a unique tag identification number 350. Each unique tag identification number 350 has embedded tag identification bits 354 and error detection code bits 358. For example, each unique tag identification number may have ninety-six (96) bit identification number and a 16-bit error detection code value. However, the present invention is applicable to other tag identification number lengths and error detection code lengths. Throughout this document, the embedded tag identification number 354 is referred to as the tag identification number.

The confirmed read flag 334 indicates whether the tag has been successfully read during a binary tree traversal. Flag 334 is stored in a memory in data storage section 330. In an embodiment of the present invention, flag 334 can be stored using similar or different technology than the data storage section 330. The confirmed read flag 334 retains its value for a period of time regardless of whether the tag experiences a power loss. The maximum length of time during which the confirmed read flag 334 is stored depends upon the memory used and often upon the environment in which the tag is operated. In an embodiment of the present invention, the confirmed read flag 334 is stored in a capacitor as a voltage. As long as the voltage is held in the capacitor, the value of the confirmed read flag 334 is stored. However, eventually, this voltage can bleed off to zero (i.e., memory time-out), causing flag 334 to be cleared. The capacitor, or other storage device, analog and/or digital, typically has a maximum storage time or duration. In an embodiment, this time is dictated by a time constant of the storage device, including a value C of capacitance of a capacitor (when present), a value R of resistance of a resistor (when present), and/or a value of any other element or combination thereof, such as an RC (resistor-capacitor) time constant. Alternatively, digital logic storage elements, such as flip-flops or "one-shot" devices, which may or may not have time constants, may be used.

In an embodiment of the present invention, the confirmed read flag 334 may also be cleared by a reader 104 before the maximum storage time is reached. For example, upon receipt of a certain symbol from the reader, tag 102 may discharge the capacitor (or otherwise clear a storage element) storing the value of the confirmed read flag 334. Alternatively, upon receipt of a certain symbol from the reader, tag 102 may ignore the confirmed read flag 334 until the flag is cleared by time-out of the memory.

RF interface portion 310, together with tag antennae (not shown), provides a bidirectional communications interface with reader 104. The RF interface receives RF signals from reader 104 and demodulates the signals into digital information symbols. The RF interface also modulates digital information symbols into RF signals.

State machine 320 may include logic, a processor, and/or other components that control the operation of tag 102. State machine 320 receives demodulated information symbols from RF interface portion 310. State machine 320 also accesses information in data storage section 330 as needed. In an embodiment, state machine 320 is implemented with digital circuitry, such as logic gates. Further details regarding state machine 320 are provided below with reference to FIG. 4.

1.2.2 Operational States of a Tag

Tag 102 can exist in various operating states. Each of these operating states describes a mode of operation for tag 102. Upon the occurrence of certain events, tag 102 can transition from one operating state to another. For example, upon occurrence of an event, tag 102 can transition from a present operating state, which is the operating state that tag 102 is operating in when the event occurs, to a new operating state, as dictated by the combination of the present operating state and the event.

Events can be triggered by detection of edges in the transmission from reader 104, by passage of a defined period of time, or by a combination of both edge detection and time passage. Examples of events include master reset event, master dormant event, and a data "NULL."

Figure 4:
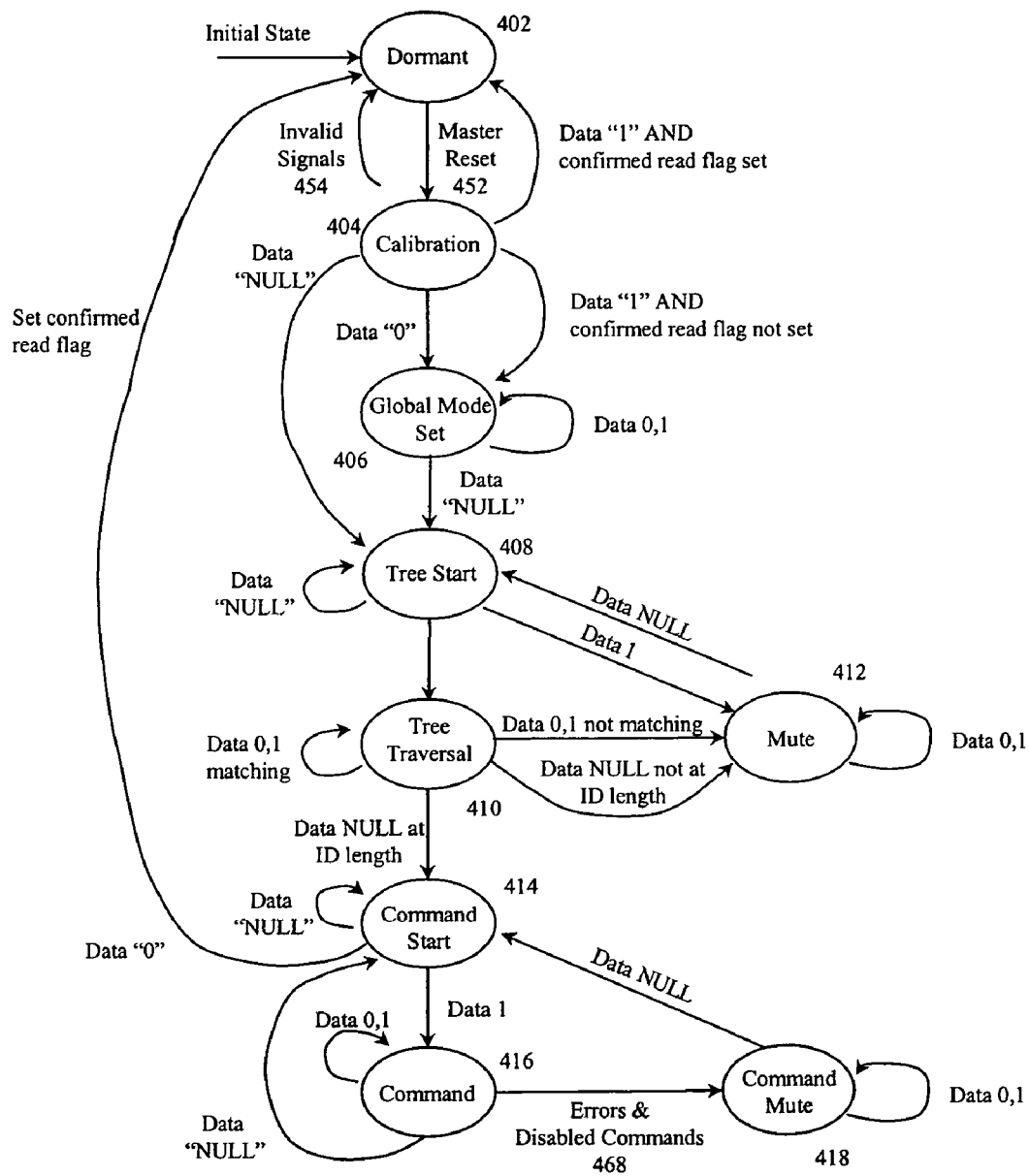
FIG. 4 is a state diagram illustrating various operating states of an RFID tag, according to an embodiment of the present invention.

FIG. 4 illustrates various operating states in a state diagram for tag 102, according to an embodiment of the present invention. In FIG. 4, each operating state is shown as an oval, and transitions between operating states are shown as connections between the ovals. The transitions are annotated with text that describes a corresponding event.

The paragraphs below describe the operating states and the respective transitions shown in FIG. 4. These particular states and transitions are presented by way of example only. Additional and alternative operating states, transitions, and transition causing events can be employed without departing from the spirit and scope of the present invention.

The first state is a dormant state 402. During dormant state 402, tag 102 is largely inactive. Therefore, power is conserved while a tag 102 is in dormant state 402. Tag 102 enters dormant state upon powering up, after receipt of a master dormant event, and at other times described below.

As shown in FIG. 4, tag 102 transitions from dormant state 402 to calibration state 404 upon a master reset event 452. In an embodiment, tag 102 can only transition to calibration state 404 from dormant state 402. In addition, only a master reset event 452 will result in a transition from dormant state 402. In alternate embodiments, other events may cause transitions from dormant state.

In calibration state 404, tag 102 initializes its timing circuitry. In an embodiment, in calibration state 404, tag 102 will not generate logical symbols "0," or "1" as they have not yet been defined. Instead, in calibration 4, tag 102 performs an oscillator calibration procedure and a data calibration procedure. The oscillator calibration procedure involves tag 102 receiving multiple oscillator calibration pulses from reader 104, defined herein as edge transition (data) events. Specific timing is provided between edge transition events. Similarly, the data calibration procedure involves tag 102 receiving multiple data calibration pulses from reader 104. Data calibration results in the definition of data symbols used in communication between the reader and the tag.

As shown in FIG. 4, tag 102 may transition from calibration state 404 to dormant state 402 upon the occurrence of an event 454. In an embodiment, event 454 is defined by the reception of a signal that is not representative of timing signals expected by tag 102. For example, in an embodiment, oscillator calibration signals are defined as 8 pulses of equal length. If the oscillator calibration pulses received by tag 102 are significantly unequal or not within an expected range of lengths, the pulses may be considered invalid, causing occurrence of an event 454. Hence, when tag 102 receives signals that do not cause successful oscillator calibration or data calibration procedures, event 454 occurs.

After successful completion of the oscillator calibration procedure, which results in a tuned oscillator, and the data calibration procedure, which results in defined data symbols, tag 102 expects to receive defined data symbols from the reader 104. The data symbols are defined as data "0," data "1," and data "NULL." Master reset and master dormant events may occur at any time, and are immediately processed after occurring.

After successful completion of the calibration procedures, tag 102 receives a data element from the reader. In a preferred embodiment, the data element is a single bit. For example, receipt of a logical "0" data element directs tag 102 to enter global mode set state 406. Receipt of a logical "NULL" directs tag 102 to enter the tree start state 408, skipping global mode state 406. This receipt of a logical "0" or "NULL" causes tag 102 to ignore its read status, as indicated by the confirmed read flag 334. In this way, the reader can address all tags in a population 120, even tags that have previously been read. However, receipt of a logical "1" directs tag 102 to evaluate the confirmed read flag 334. In such an evaluation, if the confirmed read flag 334 has been set (i.e., indicating that the tag has already been read), tag 102 transitions to dormant state 402. If the confirmed read flag 334 is not set, tag 102 transitions to global mode set state 406. Thus, by sending a logical "1," the reader can read only those tags that have not been read.

In an embodiment, global mode set state 406, tag 102 receives a sequence of bits from reader 104. When in global mode set state 406, tag 102 accepts and stores serial binary information into registers in a specific predefined order. Global modes are configured in a binary (on or off) configuration. Each bit, as received dynamically from reader 104, programs a register associated with a mode. The register is associated with a circuit or circuits controlling defined tag functions/modes. In an embodiment of the present invention, defined modes include modulator divisor control, backscatter harmonics limiter control, and backscatter power regulator control.

Modulator divisor control mode controls the frequency in which the tag will modulate back scatter. In an embodiment of the present invention, this mode is based on an initial frequency of 2.5 MHz for a data "0" and 3.75 MHz for a data "1." Alternatively, other initial frequencies can be used as would be appreciated by persons skilled in the relevant art(s). Backscatter harmonic limiter mode, when implemented, limits the energy of backscatter harmonics. This limitation reduces the effective emissions from the tag on frequencies above the fundamentals. Backscatter power regulator control mode limits the amount of backscatter power in the fundamental frequency of modulation that is reflected by the antenna attached to the tag.

The modes are determined by the number in sequence, predefined during tag design. Future modes may be defined and assigned to open bits in the sequence, although these can alternatively be defined "on the fly." In an embodiment, the tag will default (power on reset) to the bit value "0" for all modes prior to accepting the first bit in the sequence. In this way, global mode settings are a variable amount of bits. Global modes may be completely omitted in operation if all default values are acceptable for operation.

Tag 102 transitions to tree start state 408 upon receipt of a logical "NULL" data element. During tree start state 408, tag 102 expects a command from reader 104 in the form of a data symbol. In an embodiment, the command is a single bit. For example, receipt of a logical "0" symbol directs tag 102 to enter tree traversal state 410. However, receipt of a logical "1" symbol directs tag 102 to enter mute state 412. In an embodiment, receipt of a logical "NULL" symbol does not effect the state of tag 102 in tree start state.

When operating in tree traversal state 410, tag 102 transmits its identification number to reader 104 according to a binary traversal protocol that enables reader 104 to quickly interrogate a population of tags 120. An example of a binary traversal protocol is described below.

Tag 102 may enter mute state 412 from tree traversal state 410 or tree start state 408. For example, tag 102 may enter mute state 412 from tree traversal state after an unsuccessful negotiation of its tag identification number. In mute state 412, tag 102 receives data from reader 104. However, when in mute state 412, tag 102 provides no responses to reader 104. Thus, mute state 412 disables tag 102 from responding to a particular request for an identification number.

After a successful negotiation of its tag identification number, tag 102 transitions from tree traversal state 410 to command start state 414 upon receipt of a "NULL" symbol from reader 104. A successful negotiation is indicated when tag 102 receives a "NULL" symbol at the tag identification length. During command start mode 414, if a data "0" is received from reader 104, tag 102 enters dormant mode 402. This transition represents a confirmed read of tag 102. Prior to entering dormant state, tag 102 sets the confirmed read flag 334. This flag then indicates that the tag has been confirmed read by the reader.

When in command start state 414, if a data "1" is received from reader 104, tag 102 enters command state 416. In an embodiment, receipt of a logical "NULL" symbol does not effect the state of tag 102 in command start state 414.

Note that during tree traversal operations, one or more tags 102 may be active and in tree traversal state 410, or temporarily inactive and in mute state 412. Any other tags that have been processed (i.e., confirmed read) will be in dormant state 402. Reader 104 may collectively address the full population of tags 120 through implicit instructions. This means that upon receipt of a certain symbol, a tag will determine the instruction based upon its current state. Thus, a tag does not have to receive a complete "explicit" instruction to perform functions, causing less data (e.g., long bit length explicit instructions) to need to be transferred and saving transfer time. For example, reader 104 may send a logical "NULL" symbol to the population of tags. Those tags that are in mute state 412 will transition to tree start state 408. If the "NULL" is received at the identification number length, then any tag in tree traversal state will transition to command start state 414. If the "NULL" is not received at the identification number length, then any tag in tree traversal state will transition to mute state 412. Implicit instructions are also used when a fully negotiated tag is in command start state 414 or command state 416 and one or more tags are inactive and in mute state 412.

When operating in command state 416, tag 102 receives a command from reader 104. The command consists of multiple bits. In an embodiment of the present invention, the command is 8 bits in length. Command state 416 allows reader 104 to initiate features and functions on a tag, after the tag has been identified via a successful binary tree traversal. Tag 102 may transition from command state 416 to command mute state 418 upon occurrence of an event 468. In an embodiment, event 468 is defined as the detection of communications errors within a command or a request for an unknown or disabled function. Tag 102 returns to command start state 414 upon receipt of a logical "NULL" symbol from the reader.

Command mute state 418 is similar in function to mute state 412. When operating in command mute state 418, tag 102 receives data but does not respond. Tag 102 may return to command start state 414 from command mute state 418 upon receipt of a data "NULL."

1.3 Binary Tree Traversal Protocol

In accordance with an embodiment of the present invention, a binary tree traversal methodology is used in order to establish communication between a reader 104 and one of a population of tags 120 that are within the communication range of the reader. In an embodiment, contention between the tags 102 is avoided by requiring transmissions from each tag 102 to the reader 104 to be unique in a separation of frequency, but can be avoided in other ways. Contention may be defined as communications by multiple transmissions in the same frequency, time, and/or phase that thereby destructively interfere with each other's attempted transmission. Thus, in an example binary traversal algorithm, one bit of information is negotiated at a time between the reader 104 and the current population of tags 102 that the reader is addressing.

Each tag response is defined by two frequencies, one frequency for 0, and the other frequency for 1. In such a manner, many tags can simultaneously and non-destructively communicate a data 0. It is not important that the reader cannot differentiate a single data 0 from multiple data 0's, just that there exists a data 0. Alternatively, for example, a tag response may be defined by two time periods, one time period for "0", and the other for In an embodiment, the binary tree traversal process eliminates tags from communication until only one tag with a unique number is isolated and verified. As described above, each level in the binary tree represents a bit position in the tag identification number. As the reader proceeds through nodes (and levels) in the binary tree, it directs a subset of the population of tags to remain active and a subset of the population of tags to go inactive. For example, tags that last sent a matching bit remain active; those that did not will go inactive. Statistically, on each bit exchange, one half of the tag population will go inactive. This process continues until the reader reaches a node in the last level of the binary tree and results in a unique tag isolation and elimination. This process is repeated until each tag in the population of tags is isolated.

For more information concerning binary tree traversal methodology, and, more generally, communication between an RFID reader and a population of RFID tags in accordance with an embodiment of the present invention, see U.S. Pat. No. 6,002,544, entitled "System and Method for Electronic Inventory" which is incorporated herein by reference in its entirety, and the following co-pending U.S. patent applications, each of which is incorporated by reference herein in its entirety: application Ser. No. 09/323,206, filed Jun. 1, 1999, entitled "System and Method for Electronic Inventory," Attorney Docket No. 1689.0010001; application Ser. No. 10/072,885, filed Feb. 12, 2002, entitled "Method, System and Apparatus for Binary Traversal of a Tag Population," Attorney Docket No. 1689.0210001; and application Ser. No. 10/073,000, filed Feb. 12, 2002, entitled "Method, System and Apparatus for Communicating with a RFID Tag Population," Attorney Docket No. 1689.0260000.

2. Binary Tree Traversal Communication According to Present Invention

Figure 5:
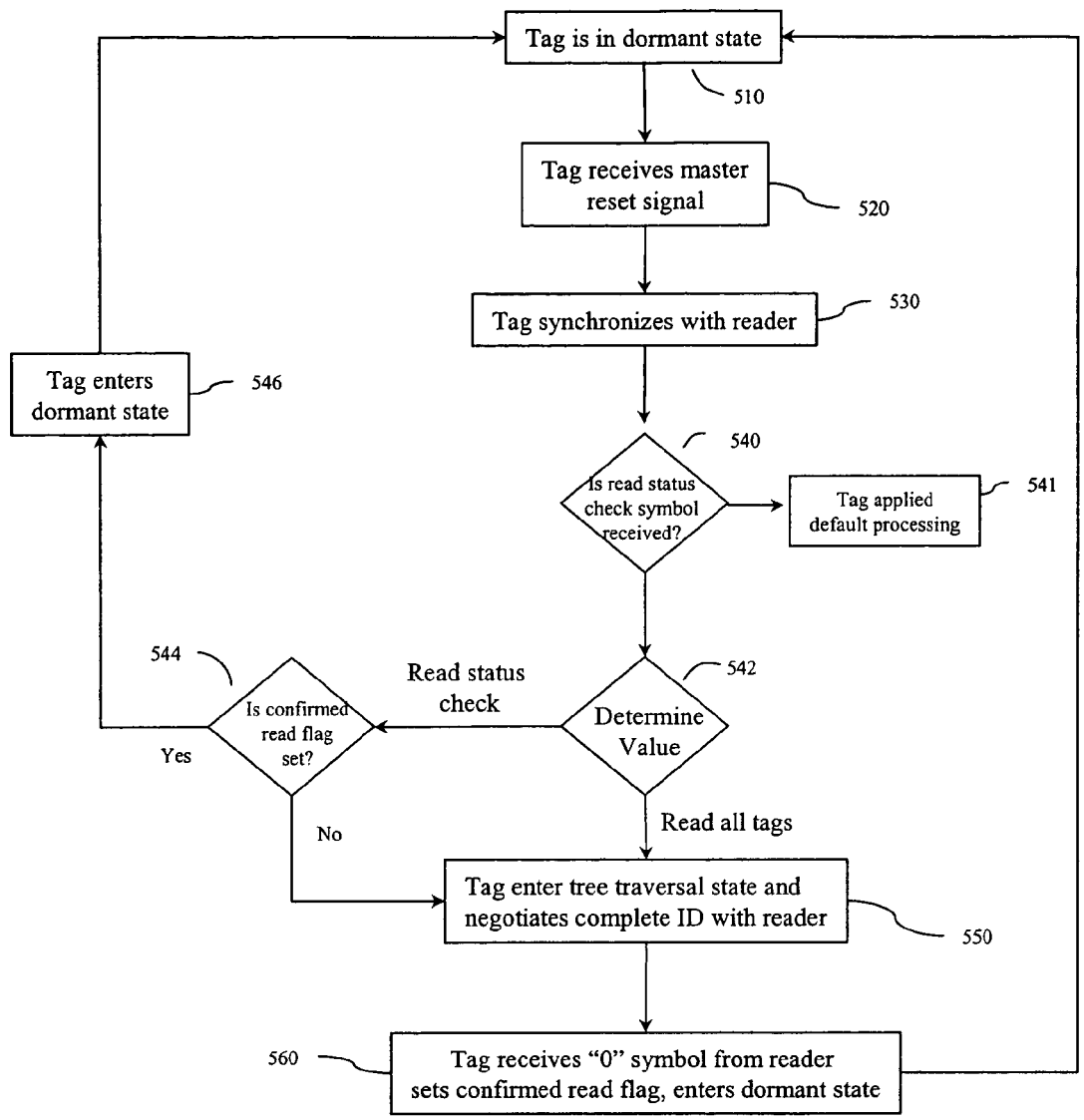
FIG. 5 is a flowchart that illustrates the operation of reader control of a persistent state stored on a tag from the perspective of a tag, according to an embodiment of the present invention.

FIG. 5 is a flowchart 500 illustrating an example operation of the binary tree traversal protocol from the perspective of a single tag 102, according to an embodiment of the present invention. By operating according to flowchart 500, after tag 102 has been successfully read, tag 102 responds only when reader clears its confirmed read flag 334. Hence, re-negotiation of tag 102 is under control of reader 104.

As shown in FIG. 5, flowchart 500 begins with step 510. In step 510, tag 102 is in dormant state 402. In step 520, tag 102 receives a master reset signal from reader 104. Upon receipt of this signal, tag 102 moves from dormant state 402 to calibration state 404.

In step 530, tag 102 is synchronized with reader 104. Accordingly, for example, in step 530, tag 102 performs oscillator calibration and data calibration with reader 104.

In step 540, tag 102 determines whether a read status check symbol or symbols have been received from reader 104. In an embodiment, the reader may also send the read status check as a command. If a read status check symbol is received in step 540, operation proceeds to step 542. If a read status check symbol is not received in step 540, operation proceeds to step 541.

In step 541, tag 102 applies default read status processing. In an embodiment, tag 102 evaluates the read flag 334 during default processing. In this embodiment, operation proceeds to step 544.

In step 542, tag 102 determines the value of the symbol received. If the value of the received symbol indicates a read status check (e.g., data element "1" received), operation proceeds to step 544. By sending a symbol indicating a read status check, the reader will negotiate only with unread tags.

In step 544, tag 102 determines whether the confirmed read flag 334 is set. If tag 102 determines that the confirmed read flag 334 is set in step 542, operation proceeds to step 546. In step 546, tag 102 enters dormant state 402 and operation proceeds to step 510. If tag 102 determines that the confirmed read flag 334 is not set in step 542, operation proceeds to step 550. Thus, read tags will remain dormant and unread tags will be negotiated.

If the value of the symbol received in step 540 indicates read all tags (e.g., data element "0" received), operation proceeds to step 550. In this manner, reader 104 negotiates with all tags within the population, even those that had been read previously. In an embodiment of the present invention, reader 104 sends a symbol or symbols that causes tag 102 to clear any value stored in its confirmed read flag 334.

In step 550, tag 102 enters tree traversal mode (corresponding to example states 410, 412, and 414 in FIG. 4) and negotiates its complete identification number with reader 104.

In step 560, tag 102 receives a symbol from reader causing the tag to transition to dormant state 402. In step 560, the tag also sets its confirmed read flag 334 to "read" prior to entering dormant state 402. This symbol may be an implicit instruction or have multiple tag functions associated with it. Operation then proceeds to step 510.

Figure 6:
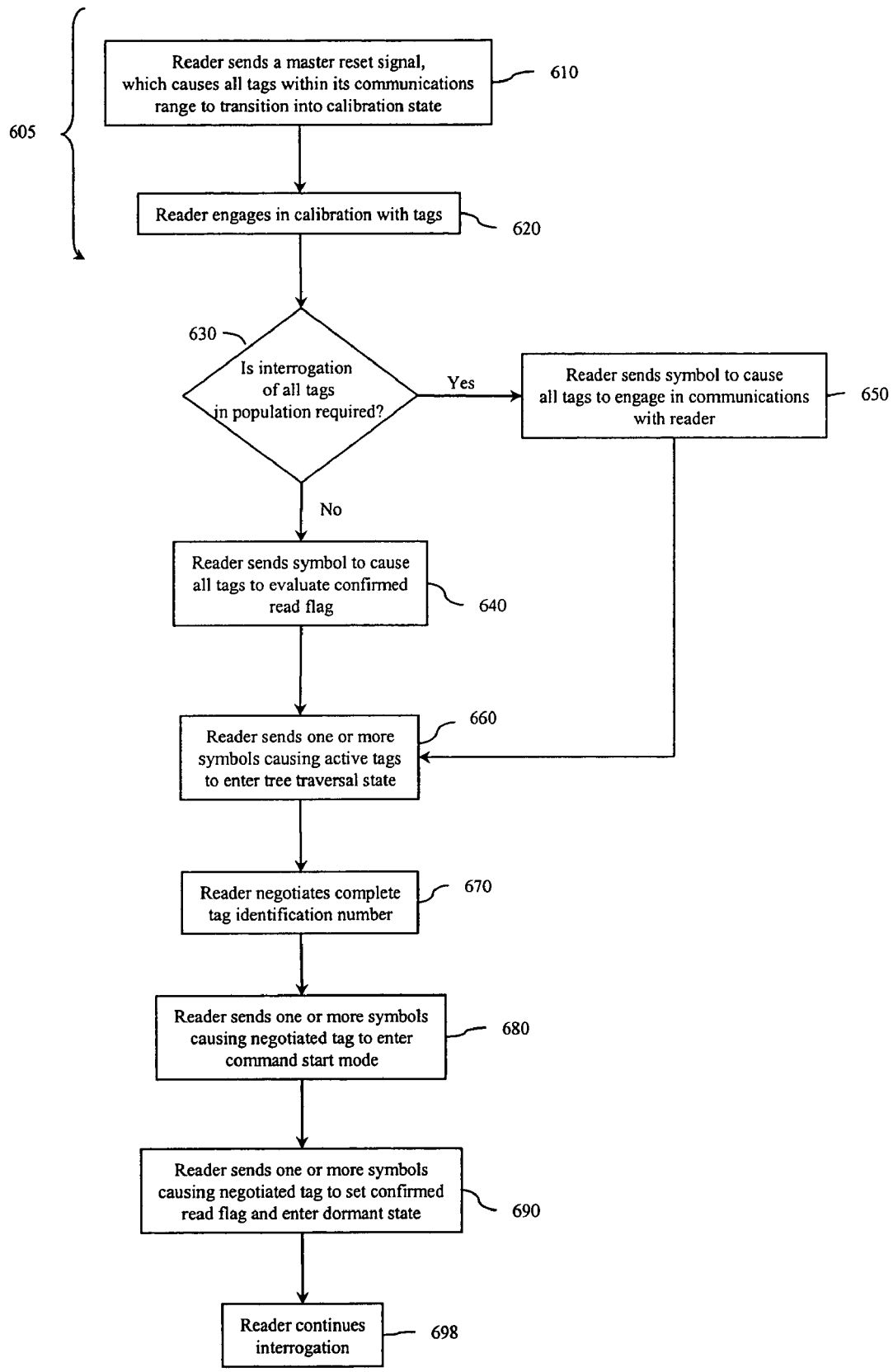
FIG. 6 is a flowchart that illustrates the operation of reader control of a persistent state stored on a tag from the perspective of a reader, according to an embodiment of the present invention.

FIG. 6 is a flowchart 600 illustrating an example operation of the binary tree traversal protocol from the perspective of reader 104, according to an embodiment of the present invention. By operating according to flowchart 600, reader 104 can elect to read all tags in the population 120, even those that have their confirmed read flag 334 set, or can elect to read only the unread tags.

Flowchart 600 begins when the reader engages in start-up section process 605. Start-up signals are sent at the beginning of the interrogation of a population of tags 120. During the process, the reader emits signals to power the tags and to configure detailed timing points as required by the protocol. FIG. 6 depicts the start-up section as including two steps.

In step 610, reader 104 sends a master reset signal. The master reset signal causes tags 102 within the communication range of reader 104 to transition to a calibration state 404.

In step 620, reader 104 calibrates tags 102. For example, reader 104 and tags 102 undergo oscillator and data calibration operations. As will be appreciated by persons skilled in the relevant arts, other methods for start-up section process 605 can be used without departing from the spirit or scope of the present invention.

In step 630, reader 104 determines whether to interrogate the entire tag population 120, including previously read tags, or to interrogate only unread tags. If reader 104 elects to interrogate the entire tag population, operation proceeds to step 650. If reader 104 elects to interrogate only unread tags, operation proceeds to step 640.

In step 640, reader 104 sends a data symbol which causes all tags within its communication range to evaluate their confirmed read flags 334. This symbol may be an implicit instruction or have multiple tag functions associated with it. In an embodiment, the reader may send a command which causes all tags within its communication range to evaluate their confirmed read flags. As a result, tags 102 having confirmed read flags set (i.e., indicating tags previously read) will transition to dormant state 402. Tags 102 having confirmed read flags that are not set will transition to global mode set state 408. Operation then proceeds to step 660.

In step 650, reader 104 sends a data symbol which causes all tags 102 within communication range of reader 104 to engage in communication with the reader. As a result, tags 102 will ignore the value of their confirmed read flags 334. In an alternate embodiment, tags 102 may also clear any value stored in their confirmed read flag 334 in step 650. In an embodiment of the present invention, the reader can send either a data "0" or a data "NULL" symbol. A data "0" symbol causes all tags to transition to the global mode set state 406. If the default global mode values are acceptable, the reader may send a data "NULL" symbol. The "NULL" symbol causes all tags to skip global mode set state 406 and enter tree start state 408. Operation then proceeds to step 660.

In step 660, reader 104 sends one or more symbols causing active tags 102 to enter into tree traversal state 410. For example, if tags 102 are in global mode set state 406, reader 104 will have to send two symbols to cause the tags to enter into tree traversal state 410. If tags 102 are in tree start state 408, the reader will only have to send one symbol to cause the tags to enter tree traversal state 410.

In step 670, reader 104 negotiates a complete tag identification number according to a binary tree traversal protocol such as the protocol described above. As a result of step 670, reader 104 is communicating with only one tag 102.

In step 680, reader 104 sends one or more symbols (e.g., data "NULL") causing the negotiated tag to enter into command start state 414. For example, reader 104 may send a single symbol to cause the negotiated tag to transition from tree traversal state 410 to command start state 414. Alternatively, reader 104 may send symbols causing tag 102 to first enter into command state 416 prior to transitioning to command start state 414.

In step 690, reader 104 sends a symbol causing the negotiated tag to set its confirmed read flag 334 and enter dormant mode 402. Operation then proceeds to step 698.

In step 698, reader 104 resumes interrogation of the tag population. This resumption can occur at various points in the interrogation protocol. For example, if additional tags in the tag population remain to be negotiated, reader 104 may proceed to step 660. The reader may alternatively choose to proceed to step 610 or to other points in the protocol.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a radio frequency identification (RFID) tag device for minimizing unintended re-negotiation of the tag device wherein the tag includes a confirmed read flag indicating whether the tag has been previously read, comprising the steps of:
   (a) receiving a symbol from a reader when an operating state of the tag is a first state;
   (b) if the received symbol has a first logical value, transitioning the operating state to a second state; and
   (c) if the received symbol has a second logical value, performing the following steps:
      (1) evaluating a confirmed read flag,
      (2) if the confirmed read flag indicates the tag has been previously read, transitioning the operating state to a dormant state, and
      (3) if the confirmed read flag indicates that the tag has not been previously read, transitioning the operating state, to the second state
   wherein the value of the confirmed read flag is retained upon removal from and re-entry into the field of interrogation.

2. The method of claim 1 further comprising the step of:
   (d) if the received symbol has a third logical value, performing the steps of:
      (1) clearing the value of the confirmed read flag, and
      (2) transitioning the operating state to the second state.

3. The method of claim 2 further comprising the step of:
   if the received symbol has a fourth logical value, transitioning the operating state to a third state.

4. The method of claim 3 wherein the first logical value is a "0" symbol, the second logical value is a "1" symbol, and the fourth logical value is a "NULL" symbol.

5. The method of claim 3 wherein the third state is a tree start state.

6. The method of claim 1 further comprising the steps of:
   negotiating a complete tag identification number with the reader when the operating state is a fourth state;
   transitioning to a fifth state when the complete tag identification has been negotiated:
   receiving a symbol from the reader when the operating state is the fifth state; and
   if the symbol has the first logical value, setting the confirmed read flag to indicate that the tag has been read; and
   transitioning the operating state to the dormant state.

7. The method of claim 6 wherein the first logical value is a "0" symbol.

8. The method of claim 7 wherein the second logical value is a "1" symbol.

9. The method of claim 7 wherein the fourth state is a tree traversal state.

10. The method of claim 1 wherein the first state is a calibration state.

11. The method of claim 1 wherein the second state is a global mode set state.

12. A method in a radio frequency identification (RFID) tag for minimizing unintended re-negotiation of the tag, wherein the tag includes a confirmed read flag indicating whether the tag has been previously read, comprising the steps of:
   (a) negotiating a complete tag identification number with a reader when an operating state is a tree traversal state;
   (b) receiving a symbol from the reader;
   (c) if the symbol has a the first logical value, setting the confirmed read flag to indicate that the tag has been read and transitioning the operating state to a dormant state; and
   (d) f the symbol has a second logical value, transitioning to a command state, wherein the value of the confirmed read flag is retained upon removal from and re-entry into the field of interrogation.

13. The method of claim 12 further comprising the steps of:
   receiving a symbol from a reader when an operating state of the tag is a calibration state;

if the received symbol has a first logical value, transitioning the operating state to a global mode set state;

if the received symbol has a second logical value, evaluating a confirmed read flag;

if the confirmed read flag indicates the tag has been previously read, transitioning the operating state to the dormant state; and if the confirmed read flag indicates that the tag has not been previously read, transitioning the operating state to the global mode set state.

14. The method of claim 12 further comprising the step of:

if the received symbol has a third logical value, transitioning the operating state to a tree start state.

15. A radio frequency identification (RFID) tag, comprising: means for storing a confirmed read flag that indicates whether the tag has been recently read, wherein the value of the confirmed read flag is retained upon removal from and re-entry into the field of interrogation.

means for receiving a symbol from a reader and responding to the reader, including means for evaluating the value of the confirmed read flag when the received symbol has a first logical value and an operating state is a first state; and means for transmitting data to the reader.

16. The RFID tag of claim 15 further comprising:

means for resetting the confirmed read flag in response to a symbol received from the reader when the RFID tag is in the first operating state.

17. The RFID tag of claim 16 wherein the first operating state is a calibration state.

18. The RFID tag of claim 15 wherein the means for storing loses the stored value after a predetermined length of time.

19. The RFID tag of claim 18 wherein the means for storing comprises a capacitor.

20. The RFID tag of claim 19 wherein the means for storing comprises a digital storage device.

21. A method in a radio frequency identification (RFID) reader for minimizing unintended re-negotiation of tags in a population of tags, comprising the steps of:

(a) determining whether an interrogation of all tags in the population of tags is required or whether an interrogation of only unread tags is required;

(b) if it is determined in step (a) that all tags in the population of tags are to be interrogated, transmitting a first symbol to the population of tags wherein the first symbol causes all tags in the population to transition to a first state; and (c) if it is determined in step (a) that only unread tags are to be interrogated, transmitting a second symbol to the population of tags wherein the second symbol causes the tags to evaluate their confirmed read flags, to transition to a dormant state if the confirmed read flag indicates the tag has been read, and to transition to the first state if the confirmed read flag indicates the tag has not been read, wherein the value of the confirmed read flag is retained upon removal from and re-entry into the field of interrogation.

22. The method of claim 21 further comprising the steps of:

negotiating a complete identification number with a tag in the population of tags; and transmitting at least one symbol to cause the first tag to set the confirmed read flag and enter the dormant state.

* * * * *

UNITED STATES PATENT AND TRADEMARK OFFICE
CERTIFICATE OF CORRECTION

| | | |
|---|---|---|
| PATENT NO. | : 7,284,703 B2 | Page 1 of 1 |
| APPLICATION NO. | : 10/688535 | |
| DATED | : October 23, 2007 | |
| INVENTOR(S) | : Powell et al. | |

It is certified that error appears in the above-identified patent and that said Letters Patent is hereby corrected as shown below:

Column 12, Line 9, please replace "state, to" with --state to--.

Column 12, Line 56, please replace "a the first" with --a first--.

Column 12, Line 60, please replace "f the" with --if the--.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,284,703 B2 Page 1 of 1
APPLICATION NO. : 10/688535
DATED : October 23, 2007
INVENTOR(S) : Powell et al.

It is certified that error appears in the above-identified patent and that said Letters Patent is hereby corrected as shown below:

IN THE SPECIFICATION

In Column 4, Line 4, delete "REID" and insert -- RFID --, therefor.

In Column 5, Line 29, delete "bidirectional" and insert -- bi-directional --, therefor.

In Column 12, Line 9, in Claim 1, after "second" delete "state" and insert -- state, --, therefor.

In Column 12, Line 30, in Claim 6, delete "negotiated:" and insert -- negotiated; --, therefor.

In Column 12, Line 42, in Claim 9, delete "claim 7" and insert -- claim 6 --, therefor.

In Column 13, Line 18, in Claim 15, delete "interrogation." and insert -- interrogation; --, therefor.

Signed and Sealed this

Thirty-first Day of August, 2010

David J. Kappos
*Director of the United States Patent and Trademark Office*